Nov. 18, 1941.    C. F. WARREN    2,262,786

COUPLING

Filed Jan. 27, 1940

Inventor
Charles F. Warren

By Munn Anderson + Liddy
Attorney

Patented Nov. 18, 1941

2,262,786

UNITED STATES PATENT OFFICE 2,262,786

COUPLING

Charles F. Warren, Wynne, Ark., assignor to S & W Hydraulic Tool Co., Wynne, Ark., a corporation of Arkansas Application January 27, 1940, Serial No. 316,013

4 Claims. (Cl. 74—50)

This invention relates to improvements in power devices and largely in an improved coupling which is used in conjunction with the axially alined shafts of a motor and pump, forming parts of one of the power units. The latter is also embraced in the invention inasmuch as the integrity of the unit depends upon the employment of the coupling therein.

But in directing attention to the coupling itself it is desired to point out that it performs at least two important functions, first the joining of the two shafts, second, the actuation of the plunger of an impact producing device which is also an element of the power unit, respecting which second function the coupling actually comprises a mechanical movement for said power unit. This preamble will serve to state the general purposes of the invention, the specific objects being as follows:

First, to provide a coupling for joining two shafts and at the same time actuating the plunger of an impact producing device, said coupling thus comprising the combination of a mechanical movement, because of its function as a driver for the plunger, and of a connecting member, because of its function in joining the shafts.

Second, to provide a coupling wherein the provision of an extension of the crank pin, necessary to the joining on of the pump shaft, also provides the foundation of a locking arrangement whereby both a relatively non-turning connection is made with said shaft and the eccentric roller is secured in position upon the crank pin.

Other objects and advantages will appear in the following specification, reference being had to the accompanying drawing, in which.

Figure 1:
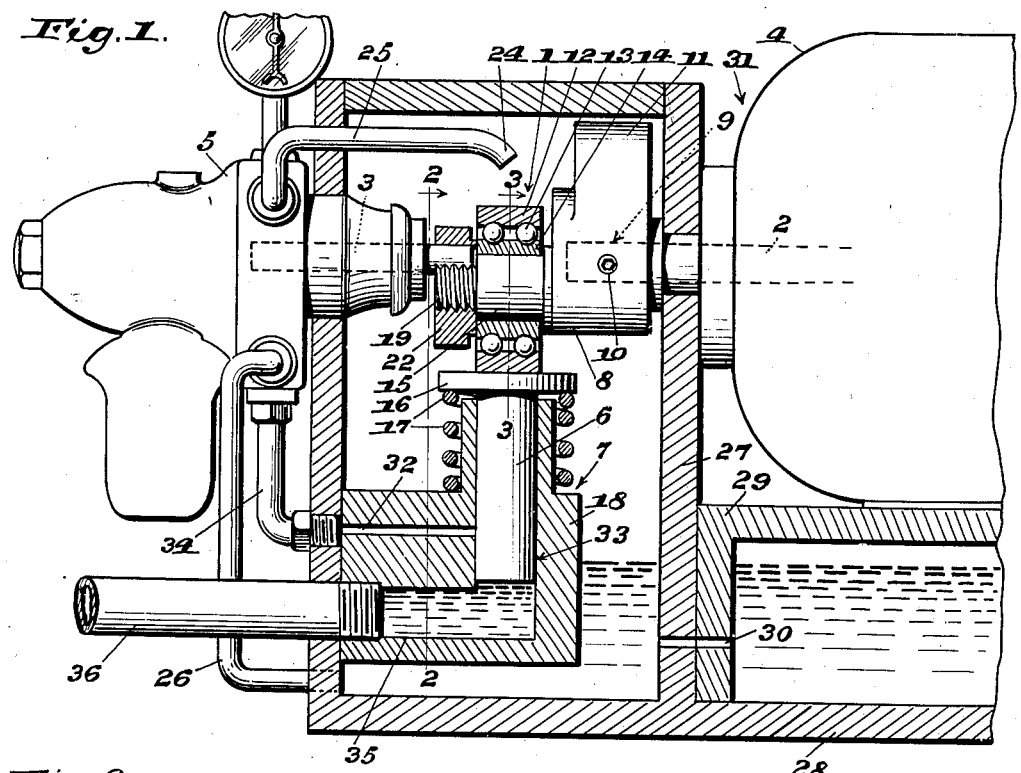
Figure 1 is a longitudinal section of a power unit, parts being shown in elevation, illustrating the use of the improved coupling.

In carrying out the invention provision is made of a coupling generally designated 1, one of the purposes served thereby being to join the shafts 2, 3, respectively of a motor 4, and a liquid pump 5. A purpose other than that of joining said two shafts in axial alinement is to actuate the plunger 6 of an impact producing device generally designated 7.

For the accomplishment of these purposes the coupling 1 has a hub 8. This hub has a centerbore 9 into which one end of the motor shaft 2 is fitted. A suitable type of set screw 10 is used to secure the hub on the shaft. The hub has a counterbalance 11 which is situated in a diametrical position in reference to an eccentric roller presently described.

Said roller is denoted 12 and it includes ball bearings 13 which insure an easy rotation upon the inner race 14 which is tightly fitted upon a crank pin 15. Said crank pin extends from the hub 8 of which it is an integral part. The crank pin is offset from the axis of the hub, as plainly denoted in Fig. 1, thus establishing the eccentric relationship of the roller 12 to the coupling 1.

The roller 12 rides the plunger 6, which has a wear plate 16 at its upper end to facilitate this purpose. The wear plate also provides one abutment for a spring 17 which rests upon the body portion 18 of the device 7. The spring 17 presses the plunger upwardly against the roller 12, the orbital motion of the latter periodically driving the plunger down against the tension of the spring.

Figure 2:
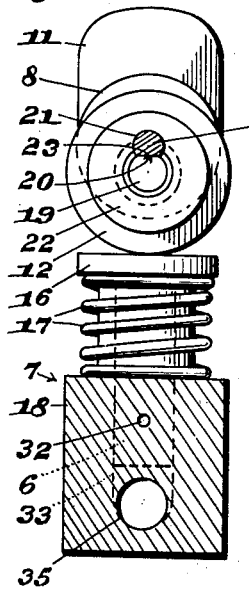
Figure 2 is a detail vertical section taken on the line 2—2 of Fig. 1.
Figure 3:
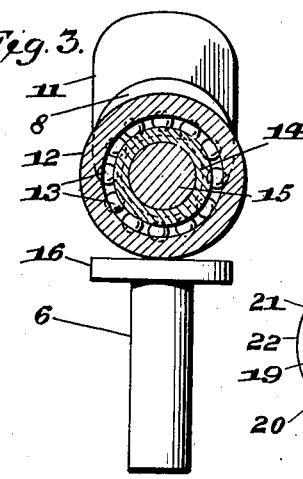
Figure 3 is a detail vertical section taken on the line 3—3 of Fig. 1.
Figure 4:
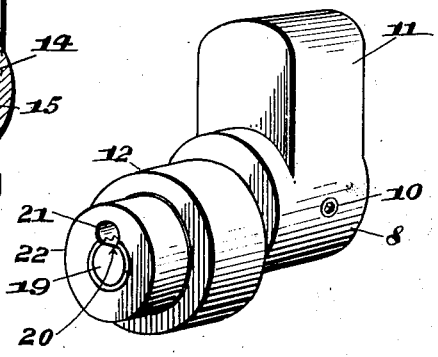
Figure 4 is a detail perspective view of the coupling.

A stub 19 projects from the crank pin 15 and is axially related thereto. Said stub is desirably threaded as shown and it constitutes an extension from the hub 8. It has a keyway 20 (Fig. 2) with which a passageway 21 registers when the member 22 containing the latter is screwed on far enough. The member 22 is thus in the nature of a nut, and one of its purposes is to confront the roller 12, more specifically the race 14, and prevent any possibility of an endwise movement of the roller on the crank pin 15. When the keyway 20 and passageway 21 are brought into registration (Fig. 2) the resulting chamber will contain the end of the pump shaft 3 which is slipped thereinto. One side of the latter is flattened at 23, thus establishing a relatively non-turning relationship of the pump shaft 3 to the coupling 1.

This simple arrangement serves not only to insure the retention of the roller 12, but also provides for the driving of the pump shaft 3. The stub 19 and member 22 thus constitute a locking means, not only locking the roller in place, but also providing the necessary grip upon the pump shaft 3.

It has been stated that the shafts 2, 3, are situated in axial alinement. This is necessary and desirable in order to secure the smooth operation of the pump 5 by the motor 4. The roller 12 is necessarily eccentrically disposed in reference to the common axis, but inasmuch as the crank pin 15 is offset in an angular position diametrically disposed in reference to the counterbalance 11, it follows that virtually no vibration will occur in the mechanism because of this particular disposition of the roller 12.

The latter is lubricated by liquid, usually oil, discharged at the point 24 of a pipe 25. This is an outlet pipe of an automatic pressure regulator embodied in the pump 5, the inlet pipe 26 of the latter having its intake at some suitable place in the reservoir 27. This reservoir includes a base 28. Said base carries a tank 29 which also carries oil. The reservoir 27 and tank 29 have communication through a common opening 30. The tank 29 merely assures an adequate supply of the liquid. As far as the supply of a reserve quantity of liquid is concerned the reservoir 27 could be regarded as the sole source.

Regardless of the size of the reservoir 27 with which the tank 29 is desired to be considered, it is seen in Fig. 1, that, as previously stated, it also serves the purpose of a mount for the motor 4 and pump 5. The result is a power unit now generally designated 31 and said power unit is of a desirably compact form. The device 7 which is the essential element of the power unit, includes a feed duct 32 which communicates with the plunger chamber 33 at one end and with a feed pipe 34 at the other end. The feed pipe is connected to pressure regulator of the pump, and when the pump is in operation it serves to keep the chamber 33 supplied with liquid, any portion of each charge of liquid not finding its way into the chamber 33 merely being by-passed in the pump and discharged at the point 24.

The plunger 6 acts as its own valve. The outlet of the feed duct 32 is uncovered at the extremity of the upstroke but is again promptly covered at the very beginning of the ensuing down stroke. Slight quantities of liquid are thus tended to be supplied to the chamber 33 and to the outlet 35 thereof with which a conduit 36 is connected. This conduit may lead off to an impact implement which is contrived to utilize the impulses delivered to the liquid column by the plunger 6.

Thus as has been pointed out already, the coupling 1 constitutes a mechanical movement of its own, inasmuch as it serves as the driver for the impact producing device 7 but it also serves to join the motor and pump shafts 2, 3, which are necessarily joined in order that the device 7 may be actuated.

I claim:

1. A coupling comprising a hub having a centerbore for the reception of a shaft, an axially offset crank pin carried by the hub, a roller mounted on the crank pin, a counterbalance on the hub, diametrically positioned in respect to the crank pin, a stub extending axially from the crank pin and having a keyway, and a member secured upon the stub, holding the roller against endwise movement upon the crank pin and having a passageway in registration with the keyway for the reception of a shaft, said centerbore and passageway being in axial alinement.

2. A coupling for simultaneously connecting the shafts of a motor and pump and actuating the plunger of an impact device supplied by the pump, consisting of a hub securable to the motor shaft, a crank pin carried by the hub and having an eccentric roller riding and actuating the plunger, and locking means extending from the crank pin providing a relatively non-turning connection with the pump shaft and at the same time securing the eccentric roller upon the crank pin.

3. A coupling for simultaneously connecting the shafts of a motor and pump and actuating the plunger of an impact device supplied by the pump, consisting of a hub securable to the motor shaft, a crank pin carried by the hub being offset from the common axis of the shafts, a roller mounted upon the crank pin, being in eccentric relationship to the shafts because of the offsetting of the crank pin and riding the plunger for its actuation, a stub extending from the crank pin and having a keyway, and a member secured to the stub against the roller, securing the position of the latter upon the crank pin and having a passageway registering with the keyway to contain and lock the pump shaft in relatively non-turning relationship to the coupling.

4. A coupling for simultaneously connecting the shafts of a motor and pump and actuating the plunger of an impact device supplied by the pump, consisting of a hub securable to the motor shaft, a crank pin carried by the hub being offset from the common axis of the shafts, a roller mounted upon the crank pin, being in eccentric relationship to the shafts because of the offsetting of the crank pin and riding the plunger for its actuation, a threaded stub extending from the crank pin and having a keyway, and a nut screwed on the stub to secure the position of the roller on the crank pin and having a passageway registering with the keyway to contain and lock the pump shaft in relatively non-turning relationship to the coupling.

CHARLES F. WARREN.